June 28, 1966 W. J. WAKATSUKI 3,258,102
PRODUCT DISLODGING AND MIXING APPARATUS
Filed Feb. 8, 1965 5 Sheets-Sheet 1
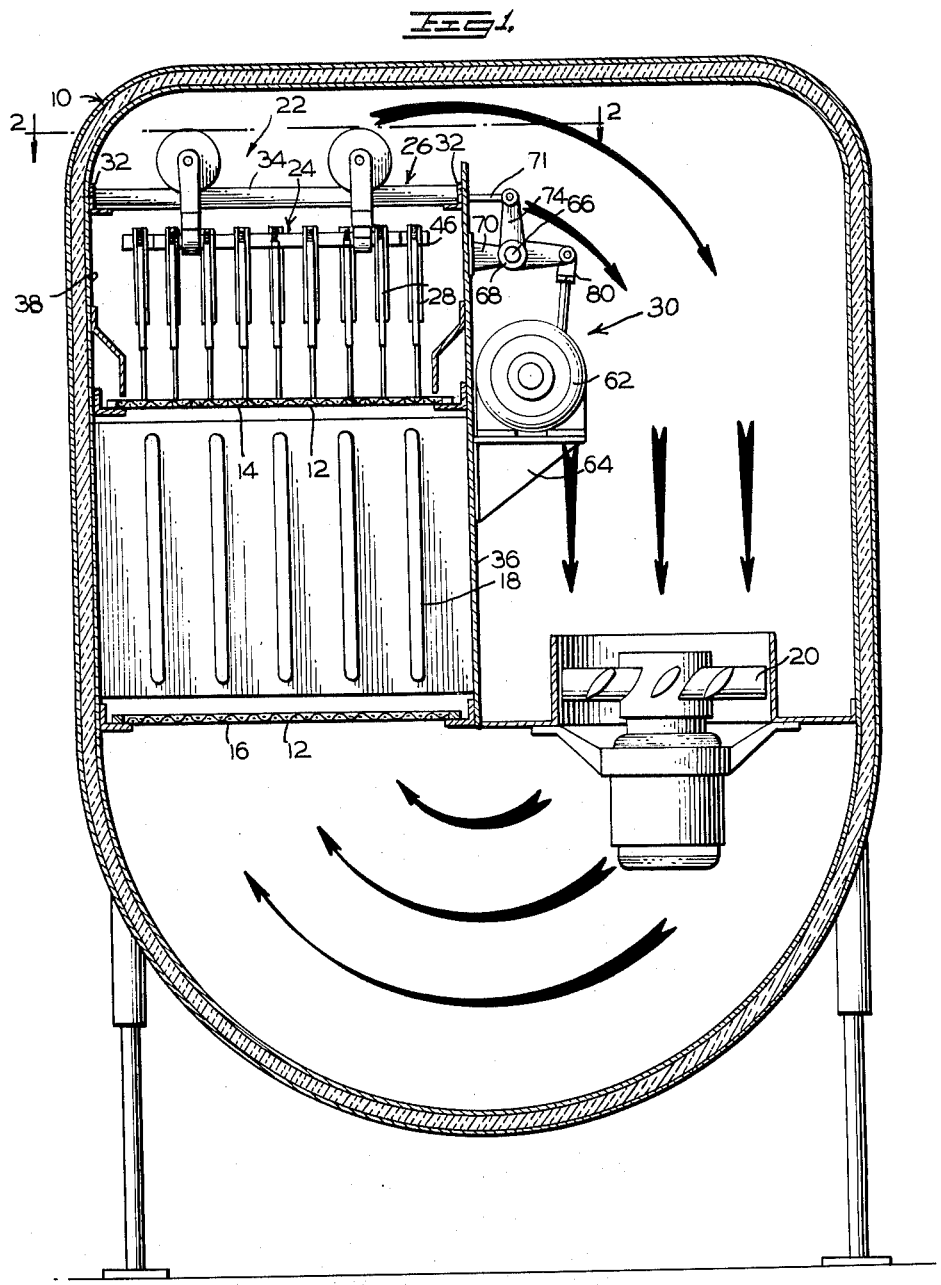
INVENTOR
WILLIAM J. WAKATSUKI
BY *Arthur Frederick*
ATTORNEY

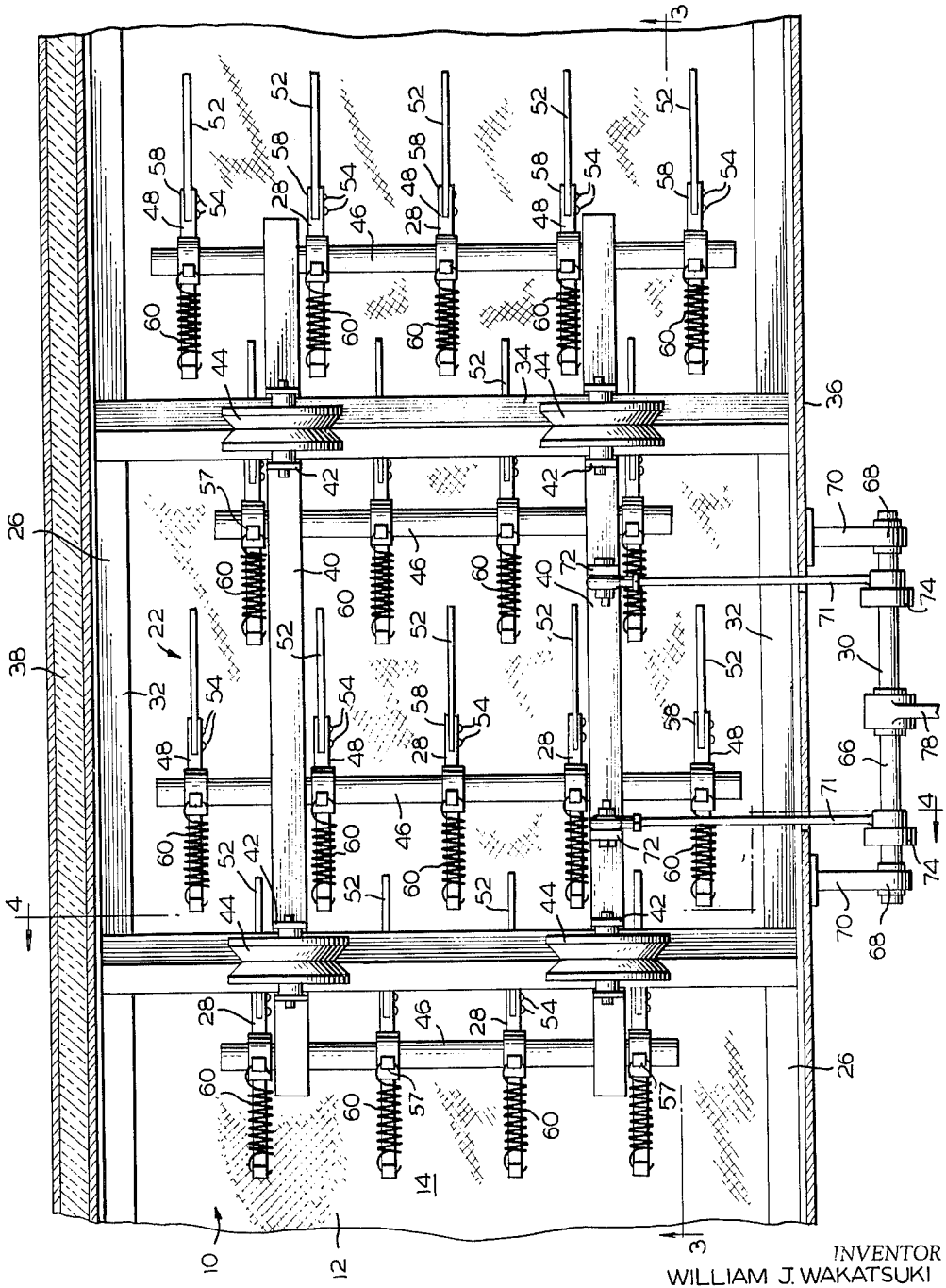

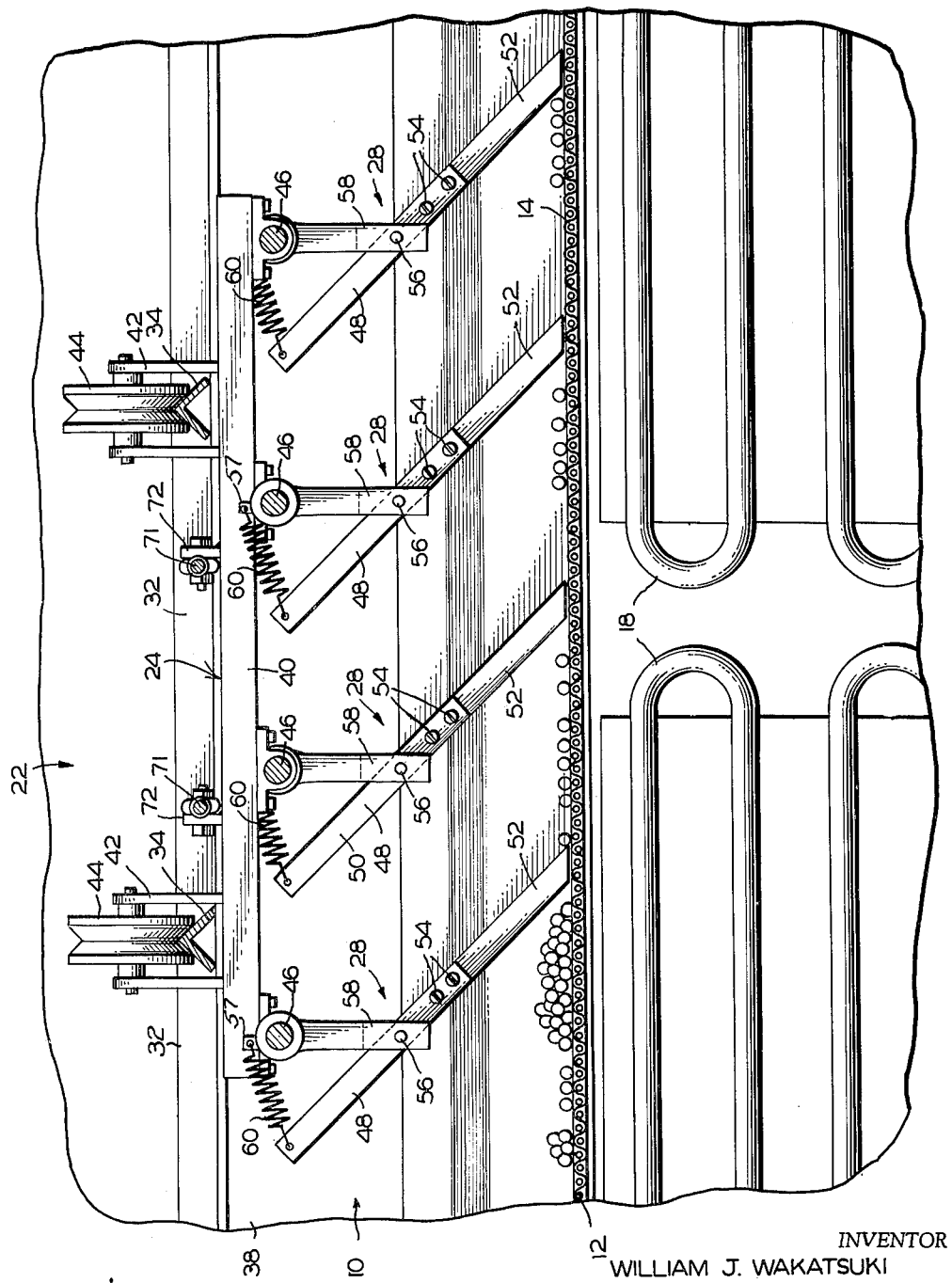

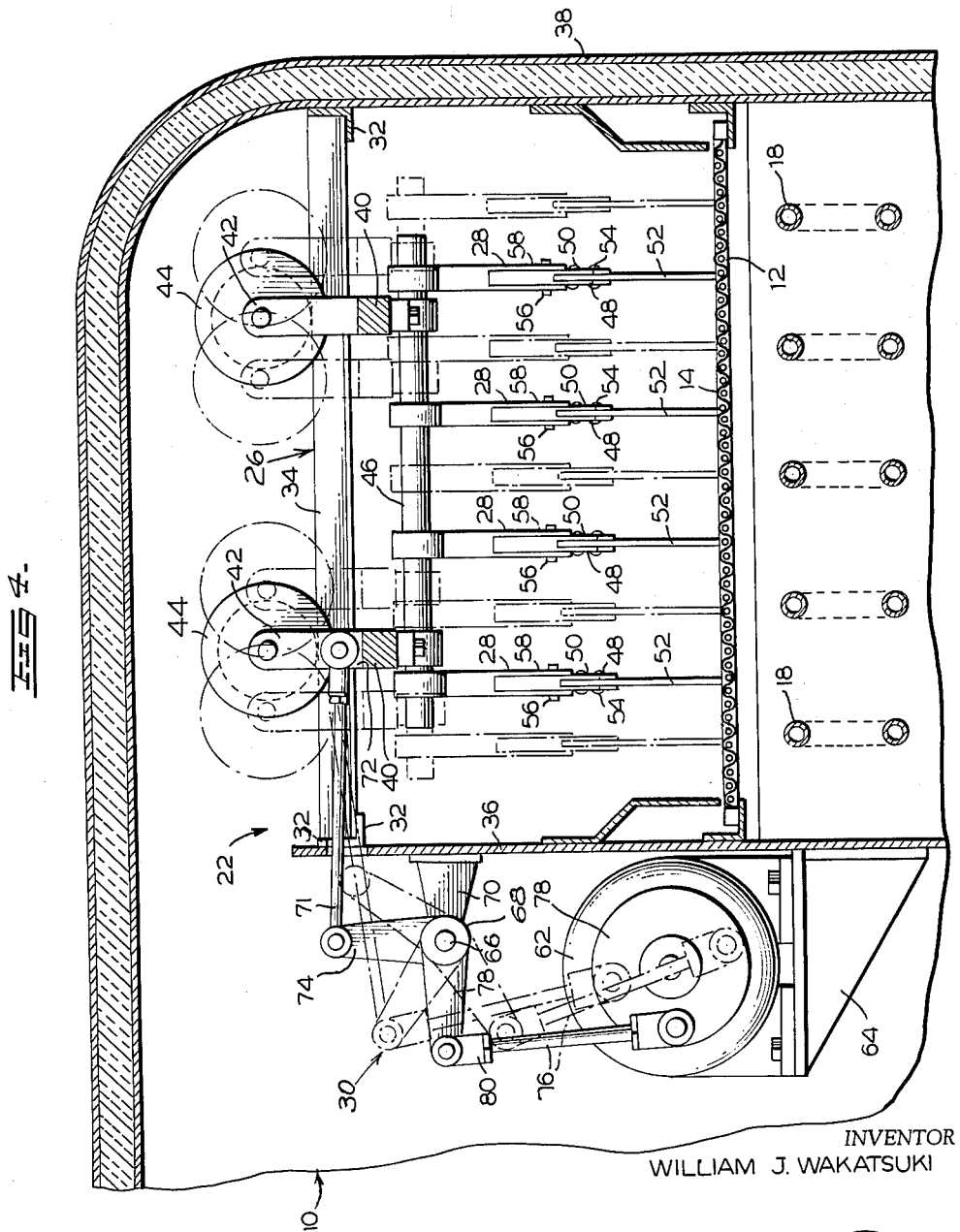

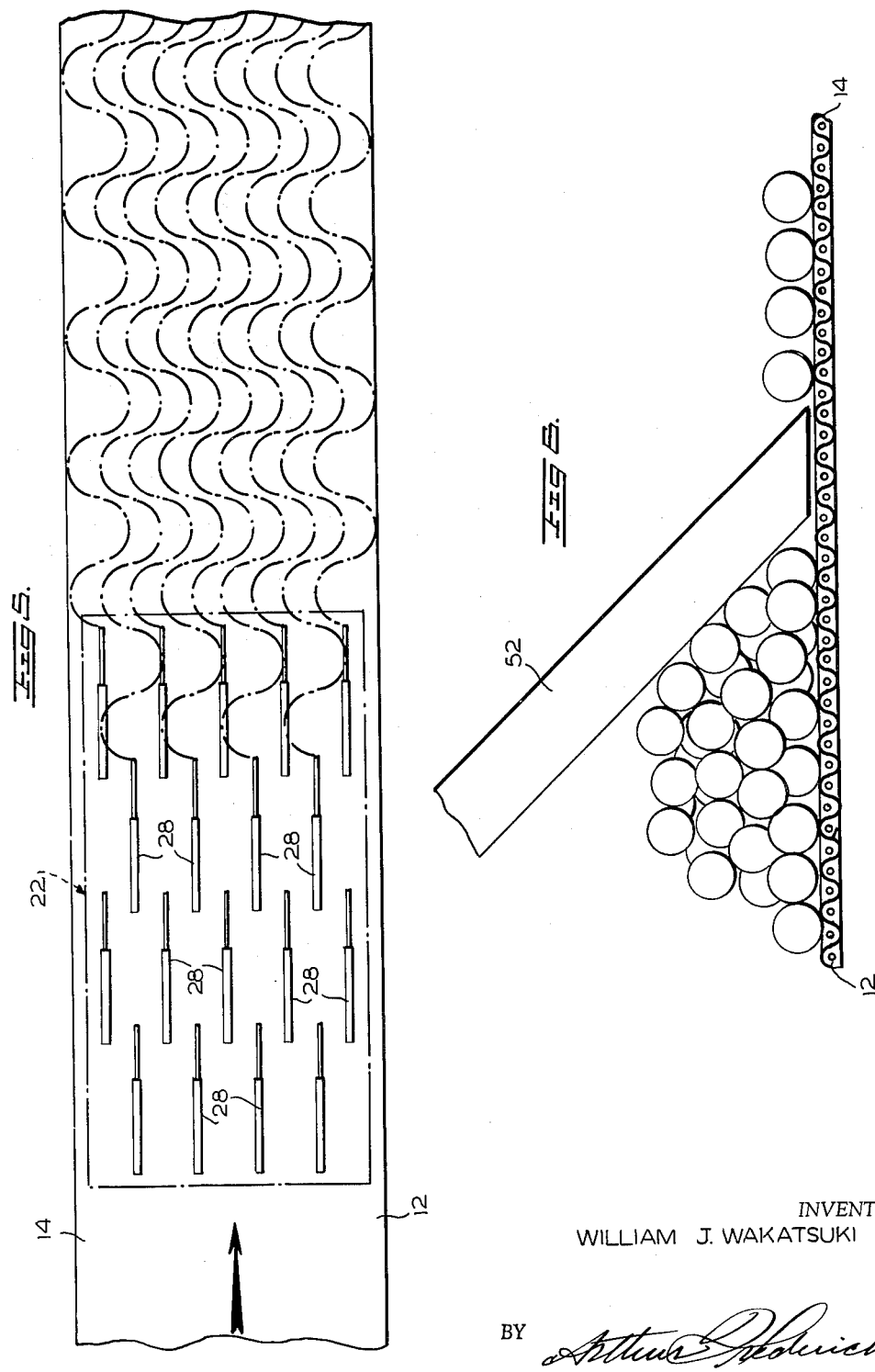

United States Patent Office 3,258,102
Patented June 28, 1966

3,258,102
PRODUCT DISLODGING AND MIXING
APPARATUS
William J. Wakatsuki, Seabrook, N.J., assignor to Frick
Company, Waynesboro, Pa., a corporation of Pennsylvania
Filed Feb. 8, 1965, Ser. No. 431,065
6 Claims. (Cl. 198—1)

This invention relates to a product dislodging and mixing apparatus and more particularly to a product dislodging and mixing apparatus cooperatively associated with a foraminous conveyor carrying discrete solid bulk materials to prevent adherence of the particles to the conveyor and to each other.

In freezing apparatuses such as shown in U.S. Patent No. 2,223,972 and No. 3,115,756, it is necessary to provide means for dislodging comestible particles adhering to the foraminous conveyor and to break up any clumps formed by particles adhering together. Agitation of the particles by freezing air circulation or localized blasts of air through the foraminous conveyor has not prevented adherence of particles to the conveyor or to each other. Various means have been devised to overcome the aforementioned problem. One such means is a fixed obstruction extending transversely of the conveyor and immediately above the conveyor as disclosed in U.S. Patent No. 3,115,756. This type of dislodging and mixing means proved unsatisfactory because it rapidly became coated with layers of frost and hence inoperative.

It is, therefore, one of the objects of the present invention to provide a product dislodging, and mixing apparatus which more effectively prevents particles from adhering to a supporting conveyor and to each other than conventional devices.

It is another object of this invention to provide a product dislodging and mixing apparatus, which, when used in a refrigerating chamber, will have a relatively longer operative usefulness before defrosting becomes necessary than heretofore known devices.

It is a further object of the present invention to provide a dislodging and mixing apparatus for a supporting and transporting particle conveyor, which apparatus effectively covers all areas of the conveyor surface.

Accordingly, this invention contemplates a dislodging and mixing apparatus cooperatively associated with a conveyor for supporting and transporting particles comprising a frame having a plurality of spaced, depending tines and a support means disposed above the conveyor for supporting the frame for reciprocative movement transversely of the conveyor so that the distal ends of the tines scribe imaginary sinous lines on the surface of said conveyor. The apparatus also includes means connected to said frame for effecting reciprocation of the frame.

While the product dislodging and mixing apparatus according to this invention will be shown and described as cooperatively associated with a conveyor for supporting and transporting comestible particles in a freezing chamber, it is to be understood that such disclosure of the invention is for illustration purposes only and that the invention has application to other systems and processes where the particles supported and transported on a conveyor have a tendency to adhere to the conveyor and/or to each other.

The invention will be more fully understood from the following detailed description thereof when considered in connection with the accompanying drawing in which:

FIG. 1 is a transverse cross sectional view showing the dislodging and mixing apparatus according to this invention as applied to a food freezing unit;

FIG. 2 is a fragmentary cross sectional view taken substantially along line 2—2 of FIG. 1 and on a somewhat enlarged scale;

FIG. 3 is a view in section taken along line 3—3 of FIG. 2;

FIG. 4 is a sectional view taken substantially along line 4—4 of FIG. 2;

FIG. 5 is a schematic representation of the pattern of the imaginary path that the tines of the apparatus according to this invention scribe on the surface of the conveyor; and FIG. 6 is a diagrammatic representation of the action of the tines to break up clumps of particles.

Now referring to the drawings, and move particularly to FIG. 1, 10 generally designates a food freezer, such as shown in U.S. Patents No. 2,223,972 and No. 3,115,756, which has a continuous foraminous conveyor 12 extending therethrough and driven by suitable means (not shown). The conveyor 12 has an upper or delivery course 14 and a lower or return course 16. A refrigerating tube bank 18 is disposed between the delivery course 14 and return course 16 of the conveyor. The refrigerating tube bank 18 is connected to a suitable refrigerating equipment (not shown) to provide for circulation of refrigerating fluid through the tube bank. A plurality of blowers 20 (only one of which is shown in FIG. 1) are disposed in the food freezer to provide for circulation of air upwardly through the return course 14 of the conveyor, refrigerating tube bank 18 and delivery course of conveyor 12, and thence down to blowers 20, as is indicated by the arrows. Food to be frozen is deposited upon the surface of delivery course 14 and is supported and transported by the moving conveyor through the freezing chamber of the food freezer. To prevent the food particles from adhering to conveyor 12, one or more product dislodging and mixing apparatuses 22 according to this invention are provided in food freezer 10 adjacent delivery course 14 of the conveyor.

As best shown in FIGS. 1 to 5, the product dislodging and mixing apparatus 22 (hereinafter referred to as product agitator) comprises a frame 24 supported for reciprocation transversely of conveyor 12 by a rail support member 26, the frame carrying a plurality of sets of spaced tine assemblies 28. A reciprocating means 30 is provided to effect reciprocative movement of frame 24.

The rail support member 26 comprises two spaced, parallel angle irons 32 and two spaced parallel rails 34 extending between and suitably connected at opposite ends, as by welding, to angle irons 32. Angle irons 32 are supported in any suitable manner above and adjacent opposite sides of delivery course 14 of the conveyor; as for example, angle irons 32 may be secured to a partition 36 and outer wall 38 of food freezer 10 (see FIG. 1). Rails 34 are shown as inverted angle irons but need not be so formed. Rails 34 may be of any suitable construction, such as the conventional I rail cross-sectional design without departing from the scope and spirit of this invention.

The frame 24 comprises two spaced parallel beams 40. To each of the beams 40 are secured pairs of upstanding brackets 42. A wheel 44 is mounted for rotation on each of the pairs of brackets 42. The brackets 42 and wheels 44 are dimensioned so that the wheels when in engagement with rails 34 support frame 24 below rails 34 and between angle irons 32. Beams 40 are held in spaced parallelism by plurality of spaced shafts 46, each of which form a component of each tine assembly 28. Each shaft 46 is secured to beams 40 as by welding or in any other suitable manner.

Each tine assembly 28 comprises a plurality of pivotally supported fingers or tines 48. As best shown in FIG. 3, each tine 48 consists of a metallic body portion 50 and a coextensive wear portion 52, which is constructed of wear resistant, self-lubricating resin material, such as is sold under the trademark "Delrin," "Teflon," or "Nylon." Wear portion 52 is secured at one end of the end of body portion 50 by screws 54 or by some other suitable securing means. Each tine 48 is pivotally mounted at 56 between two spaced ears 58 secured to and depending from shaft 46. A spring 60 is secured at one end to one of the tabs 57 secured to the top of ears 58 and at the opposite end to the end of body portion 50 to thereby bias the tine in a clockwise direction around pivot 56, as viewed in FIG. 3, and cause the distal end of wear portion 52 to ride against the surface of conveyor 12. Since each tine 48 is pivotally supported and resiliently biased by spring 60 to engage the surface of the delivery course 14 of conveyor 12, each is capable of independent pivotal movement toward and away from the surface of the conveyor to prevent damage to the comestible particles carried by the conveyor.

The reciprocating means 30 comprises a motor 62 which is an electric or an air driven motor mounted on a bracket 64 attached to partition 36 or in some other suitable manner or place adjacent frame 24. Above the motor is disposed an actuating shaft 66 which is journalled in bearings 68 supported on brackets 70 secured to partition 36. To connect shaft 66 to frame 24, a pair of push-pull rods or links 71 are pivotally anchored at one end to upstanding ears 72 which are welded or otherwise suitably secured to one of the beams 40 and at the opposite ends pivotally connected to the distal ends of arms 74. Arms 74 are keyed or secured to shaft 66 in some other suitable manner. To effect rotation and hence movement of arms 74, motor 62 is connected to shaft 66 by means of a linkage assembly comprising a connecting rod 76 and a drive wheel 78. One end of connecting rod 76 is pivotally connected eccentrically to wheel 78 driven by motor 62 and its opposite end 80 is pivotally connected to one end of drive arm 78 which is secured to shaft 66 for conjoined rotation with the latter.

In the operation of the aforedescribed product agitator 22, reciprocation of frame 24 is effected by running motor 62. Operation of motor 62 causes rotation of wheel 78, which rotation causes reciprocatory movement of connecting rod 76. Reciprocation of connecting rod 76 moves drive arm 78 back and forth, through an arc, which arcuate movement rotates shaft 66 and arms 74 through similar arcs. The arcuate movement of arms 74 is translated into a linear reciprocative movement by links 71 which are connected to arms 74 and one of the beams 40 of frame 24. Beams 40 and tine assemblies 28 carried by beams 40 are supported for reciprocation by wheels 44 which ride upon rails 34. As schematically shown in FIG. 5, the tine assemblies 28 are reciprocated transversely of the conveyor as the latter moves in the direction indicated by the arrows, each finger or tine 48 scribes, as indicated by the broken lines in FIG. 5, an imaginary sinuous path on the surface of conveyor 12. Because of the staggered arrangement of the tines 12 and the extent of reciprocation, the sinuous tine paths overlap each other and extend the full width of the conveyor. This functional effect insures that all portions of the width of the conveyor are touched by the tines and no particle or particles of product carried on the conveyor escape contact with a tine.

It is believed readily apparent from the foregoing description that a novel product agitator has been provided, which agitator effectively prevents all product particles from adhering to the conveyor surface and prevents product particles fom adhering together in clumps. It is a product agitator which, when used in a comestible freezing chamber, maintains its effectiveness despite accumulation of frost on the apparatus.

Although but one embodiment of the invention has been illustrated and described in detail, it is to be expressly understood that the invention is not limited thereto. Various changes can be made in the arrangement of parts without departing from the spirit and scope of the invention, as the same will now be understood by those skilled in the art.

What is claimed is:

1. A product dislodging and mixing apparatus in combination with a continuously moving conveyor comprising
   (a) a support means disposed adjacent the conveyor,
   (b) a frame supported by said support means for reciprocative movement relative to the conveyor,
   (c) a plurality of tines carried by said frame and engaging the surface of said conveyor, and
   (d) motive means connected to said frame to reciprocate the latter in a plane parallel to the surface of the conveyor and transversely of the direction of travel of the conveyor.

2. The apparatus of claim 1 wherein each of said tines is pivotally supported by the frame for movement independent of each other.

3. In combination with a continuously moving conveyor for supporting and transporting particles of material, a product dislodging and mixing apparatus comprising
   (a) a supporting structure disposed adjacent the conveyor,
   (b) a frame supported above the conveyor by the support means and for reciprocative movement transversely of the conveyor,
   (c) a plurality of tines carried by said frame in spaced relation to each other transversely and longitudinally in a staggered relationship,
   (d) each tine being pivotally connected to the frame to engage the conveyor and resiliently biased toward the conveyor so as to move toward and away from the conveyor,
   (e) each tine having a tip end portion for engaging the surface of the conveyor of material having a relatively high wear resistance and self-lubricating characteristics, and
   (f) reciprocating power means connected to the frame to provide reciprocation of the frame so that as the conveyor moves each tine scribes an imaginary sinuous line on said conveyor.

4. The apparatus of claim 3 wherein each tine is resiliently biased by a spring.

5. The apparatus of claim 3 wherein said supporting structure has at least a pair of rails extending transversely of the conveyor and the frame is provided with wheels for engaging the rails.

6. In combination with a continuously moving conveyor for supporting and transporting comestible product in a freezing chamber, a product dislodging and mixing apparatus comprising
   (a) a supporting structure disposed in the freezing chamber adjacent the conveyor,
   (b) said supporting structure having at least a pair of spaced rails extending transversely of the conveyor,
   (c) a frame having wheels for engaging said rails and supporting the frame above the conveyor for reciprocative movement relative to the conveyor,
   (d) a plurality of tines carried by said frame in spaced relation to each other in a transverse and longitudinal direction,
   (e) each tine being pivotally supported by the frame and dimensioned to engage the surface of the conveyor, (f) a spring for each tine to bias one end of the tine toward the surface of the conveyor to tend to maintain the tine in constant contact with the conveyor, (g) each tine having a tip end portion for engaging the surface of the conveyor of material having relatively high wear resistance and self-lubricating characteristics, and (h) reciprocating power means connected to the frame to effect reciprocative movement of the frame so that as the conveyor moves each tine scribes an imaginary sinuous line on said conveyor.

References Cited by the Examiner

UNITED STATES PATENTS

| | | | |
|---|---|---|---|
| 239,216 | 3/1881 | Bayley | 198—166 |
| 2,229,000 | 1/1941 | Birdseye | 62—381 |
| 3,156,346 | 11/1964 | McDuffie | 198—223 |

EVON C. BLUNK, *Primary Examiner.*

R. WALKER, R. J. HICKEY, *Assistant Examiners.*